United States Patent [19]

Kuroda et al.

[11] Patent Number: 4,999,665
[45] Date of Patent: Mar. 12, 1991

[54] CAMERA WITH DISPLAY DEVICE

[75] Inventors: Hirokazu Kuroda; Masaaki Nakai; Takehiro Katoh; Tetsuro Ohya; Shuji Izumi; Akira Okuno, all of Osaka, Japan

[73] Assignee: Minolta Camera Kabushiki Kaisha, Osaka, Japan

[21] Appl. No.: 352,257

[22] Filed: May 16, 1989

[30] Foreign Application Priority Data

May 16, 1988 [JP] Japan ................................ 63-119008
May 16, 1988 [JP] Japan ................................ 63-119009
May 16, 1988 [JP] Japan ................................ 63-119010
May 16, 1988 [JP] Japan ................................ 63-119011

[51] Int. Cl.$^5$ ............................................. G03B 17/20
[52] U.S. Cl. .................... 354/468; 354/289.1; 354/476
[58] Field of Search ............ 354/468, 484, 465, 289.1, 354/429, 476, 127.12, 127.1; 324/433, 435

[56] References Cited

U.S. PATENT DOCUMENTS

| | | | |
|---|---|---|---|
| 4,373,791 | 2/1983 | Araki | 354/407 |
| 4,432,628 | 2/1984 | Sakurada et al. | 354/289.12 |
| 4,447,719 | 5/1984 | Ogasawara | 354/409 |
| 4,457,604 | 7/1984 | Tsuboi | 354/289.12 |
| 4,571,051 | 2/1986 | Kazami | 354/468 |
| 4,623,238 | 11/1986 | Taniguchi et al. | 354/406 |
| 4,636,055 | 1/1987 | Alyfuku | 354/465 |
| 4,641,942 | 2/1987 | Sakai et al. | 354/406 |
| 4,662,736 | 5/1987 | Taniguchi et al. | 354/468 |
| 4,687,915 | 8/1987 | Sakai et al. | 354/402 |
| 4,709,138 | 11/1987 | Suda et al. | 354/408 |
| 4,751,546 | 6/1988 | Yamamoto et al. | 354/468 |
| 4,762,986 | 8/1988 | Suda et al. | 354/402 |
| 4,766,302 | 8/1988 | Ishida et al. | 354/408 |
| 4,783,677 | 11/1988 | Hamada et al. | 354/402 |
| 4,816,856 | 3/1989 | Hamada et al. | 354/402 |
| 4,855,781 | 8/1989 | Hoshino | 354/468 |
| 4,860,045 | 8/1989 | Hamada et al. | 354/402 |

Primary Examiner—L. T. Hix
Assistant Examiner—Cassandra C. Spyrou
Attorney, Agent, or Firm—Burns, Doane, Swecker & Mathis

[57] ABSTRACT

A camera comprises a main switch, a battery, a battery checking circuit, a display device, a timer and a controller. The camera can be operative by the turn ON of the main switch and can not be operative by the turn OFF of the main switch. The battery supplies an electrical power to circuits in the camera. The battery checking circuit checks a state of the battery. The timer counts a predetermined period of time in response to the turn ON of the main switch. The controller controls the display device based on a result of the battery checking circuit to display the state of the battery during the predetermined period of time and turning off a display of the display device if the state of the battery is better for the camera than a predetermined state after a lapse of the predetermined period of time. Thereby, it is easy to see the other display of the camera in the display device.

16 Claims, 11 Drawing Sheets

CAMERA WITH DISPLAY DEVICE

BACKGROUD OF THE INVENTION

1. Field of the Invention

The present invention relates to a camera with a display device and particularly relates to such a camera including a display device which performs display of the state of a battery incorporated in the camera, display of indicating that an object to be photographed is moving and display of functions which have been selected.

2. Description of the Prior Art

Conventionally, a display device in a camera is suggested to perform display of the state of a battery during ON-state of a main switch. And a display device is also suggested to perform it only when the remainder of the battery capacity is decreased beyond predetermined value.

However, in the former situation, the display of the remainder of the battery capacity is always performed and therefore the display is performed in a position close to other displays in a small display panel. As a result, it is difficult to see the other display.

In the latter case, the above-mentioned problem in the former case is eliminated. However, the display is suddenly performed and therefore it is difficult for a user to prepare the battery timely.

Conventionally, a camera is also suggested to perform display for a focusing condition in a manner that only the display for infocus condition and the display for not-infocus condition are performed in a continuous AF (autofocus) condition (in which the shifting amount of a focusing lens is continuously calculated corresponding to the distance between the object and the camera, and the focusing lens is moved based on the calculated shifting amount). In this conventional camera, a display for showing the continuous AF condition is not performed. This gives an uneasiness to a photographer engaged in photographing.

On the other hand, there are known camera capable of changing over the AF mode between spot AF mode and wide AF mode of which a AF zone (focus detection area) is wider than that of the spot AF mode. In accordance with this change-over, display for the AF mode through marks indicating the configurations of respective AF zone also changes over. However, it is often difficult for a photographer to recongnize the AF mode respectively selected. For example, in spot AF mode, only a small rectangular mark corresponding to the AF zone of the spot AF mode is displayed and therefore it is not easily judged whether or not the spot AF mode has been selected.

SUMMARY OF THE INVENTION

The object of the present invention is to provide a camera with a display device by which display of the remainder of the battery is performed in superior manner for use.

The other object of the present invention is to provide a camera with a display device by which display of the information that the object is moving is performed properly and intelligibly.

The further object of the present invention is to provide a camera with a display device by which display of the selected function together with display of the unselected function is performed intelligibly.

In accordance with one feature of the present invention, the camera comprises:

manually operable means having first state in which the camera can not be operative and a second state in which the camera can be operative for changing over from the one state to the other state;

a battery for supplying an elctrical power to circuits in the camera;

battery checking means for checking a state of said battery;

display means for displaying the state of said battery;

timer means for counting a predetermined period of time in response to the fact that a state of said manually operable means changes into the second state from the first state; and control means for controlling said display means based on a result of said battery checking means to display the state of said battery during the predetermined period of time and turning off a display of said display means if the state of said battery is better for the camera than a predetermined state after a lapse of the predetermined period of time.

In accordance with another feature of the present invention, the camera comprises:

moving object detecting means for detecting whether or not an object to be photographed is moving;

display means having a plurality of segments for displaying a condition of a movement of the object; and control means for controlling said display means to display an indication which looks like flowing when said moving object detecting means detects that the object is moving.

In accordance with further another feature of the present invention, the camera comprises:

selecting means for selecting either of the first mode and the second mode;

first display means for displaying a first indication corresponding to the first function, said first displaying means having a normal display mode and a supplementary display mode in which the first indication is displayed thinly than in the normal display mode;

second display means for displaying second indication corresponding to the second function; and control means for controlling said first display means to display the first indication in the normal display mode when said selecting means selects the first mode, and for controlling said first display means to display the first indication in the supplementary display mode and said second display means to display the second indication when said selecting means selects the second mode.

BRIEF DESCRIPTION OF THE DRAWINGS

These and other objects and features of the present invention will become apparent from the following description taken in conjunction with preferred embodiment thereof with reference to the accompanying drawings, throughout which like parts are designated by like reference numerals, and in which.

DETAILED DESCRIPTION OF THE PREFERRED EMBODIMENT

Figure 1:
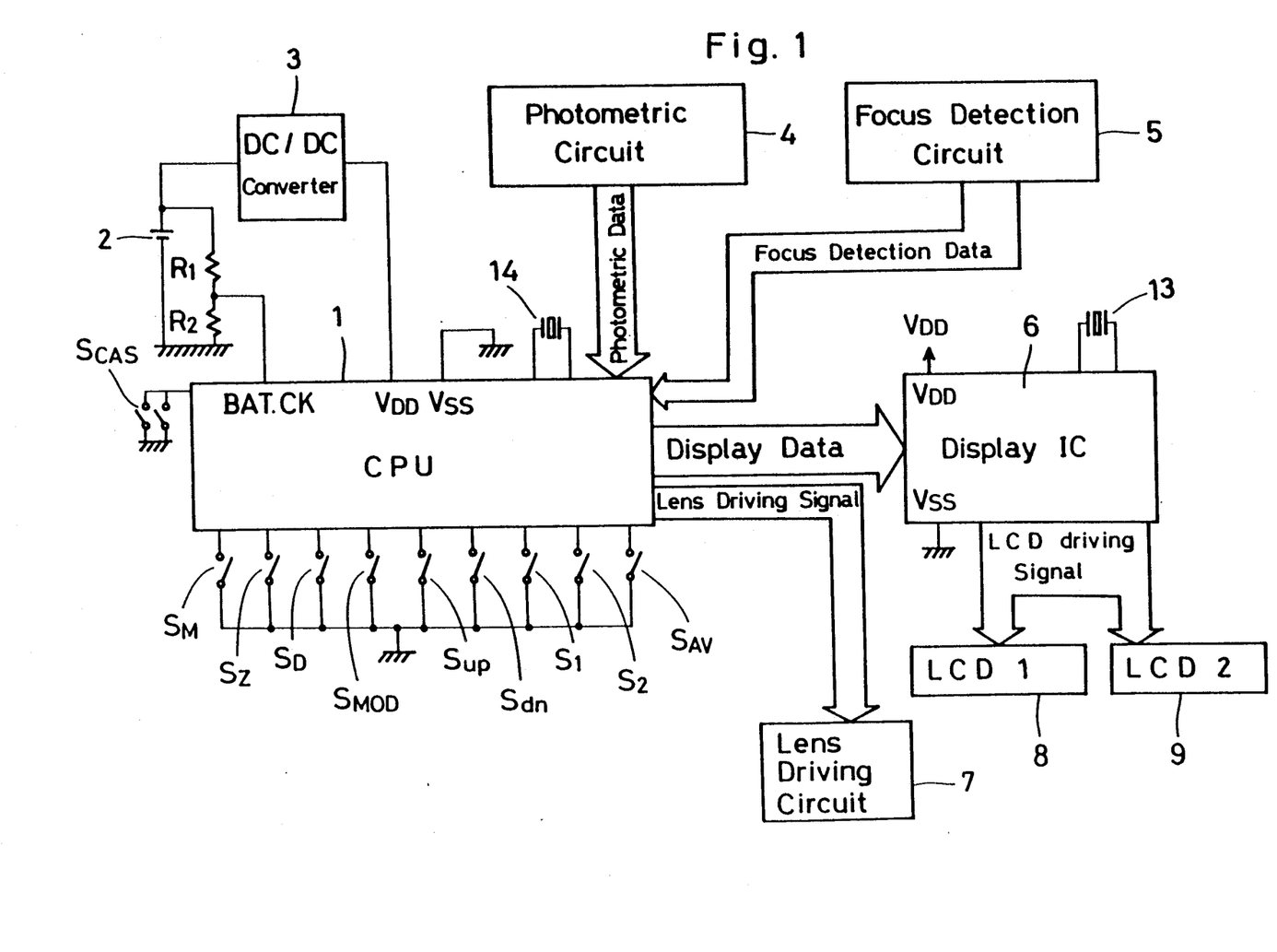
FIG. 1 is a circuit block diagram of a camera constructed according to the present invention.

Hereinafter, description is made on an embodiment of the present invention according to drawings. FIG. 1 is a block diagram showing the general display system of a camera in this embodiment. In this FIG. 1, the output voltage of a battery 2 attached to the camera is divided by resistor $R_1$ and $R_2$ and is then supplied to CPU 1 constituted with a micro-computer. A power source voltage that is the output voltage of the battery 2 is stabilized by a DC—DC converter 3 and is also supplied to the CPU 1. This DC—DC converter 3 is installed to eliminate the effect of voltage fluctuation produced principally when a lens driving system or the like is operated.

Figure 2:
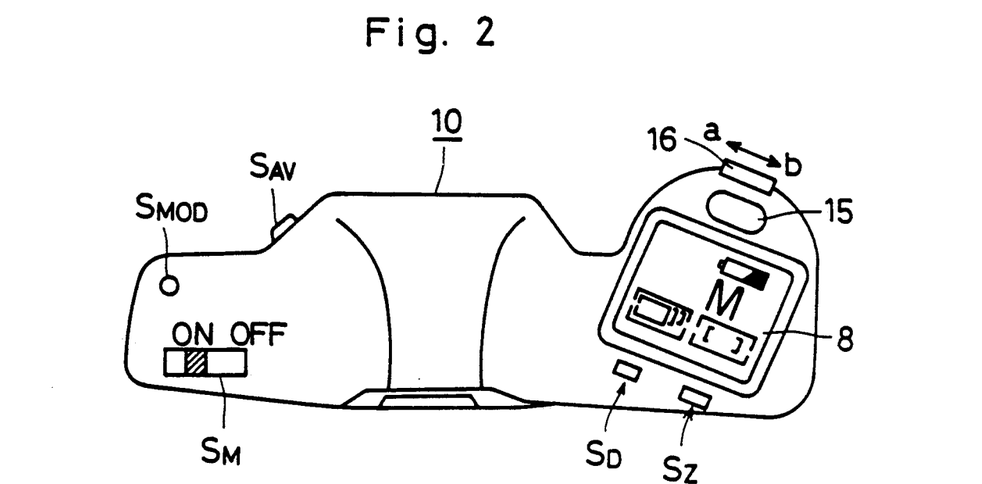
FIG. 2 is a top view of the camera.
Figure 3:
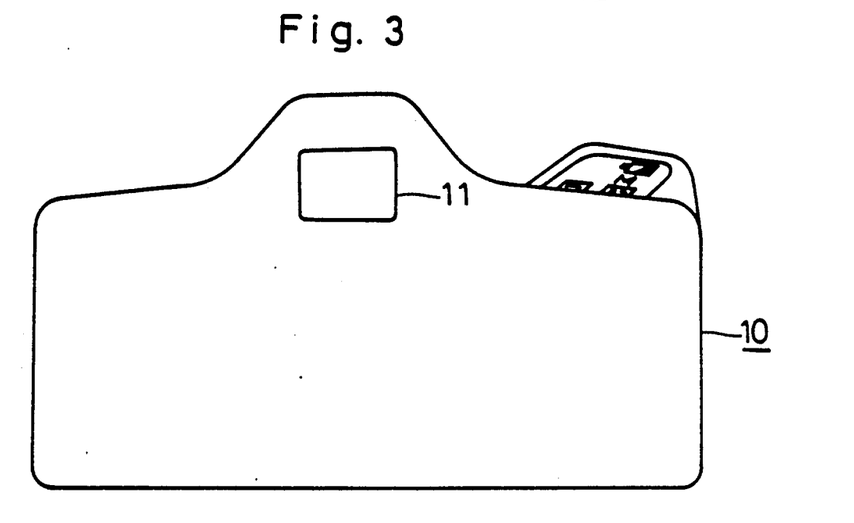
FIG. 3 is a rear view of the camera.
Figure 4:
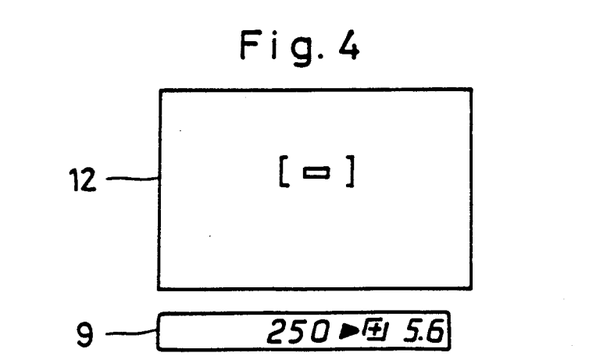
FIG. 4 is a view showing an image area and a display part in a finder of the camera.

The CPU 1 and various circuits connected to this CPU 1 give and receive data. And a photometric circuit 4 gives photometric data and a focus detection circuit 5 gives focus detection data for an automatic focusing control respectively to the CPU 1. On the other hand, the CPU 1 sends display data to a display IC 6 and gives a lens drive signal to a lens driving circuit 7. The display IC 6 gives a drive signal to an external display part 8 and an internal display part 9 which are constituted by a liquid crystal device. The external display part 8 is installed on the right top surface of camera body 10 as shown in FIG. 2, and the internal display part 9 is provided in a finder 11 as shown in FIG. 3. FIG. 4 shows the internal display part 9 in the finder along with a finder screen 12.

Reverting to FIG. 1, a crystal oscillator 13 is connected to the display IC 6 via terminal pins thereof, and is used to produce a clock signal for driving the above-mentioned external display part 8 and internal display part 9 formed with liquid crystals. A crystal oscillator 14 for generating clock pulses and various switches are connected to the CPU 1. These switches include a CAS switch $S_{CAS}$ used for inputting the film speed value based on a DX code on a patrone, a main switch $S_M$ turned on when the camera is used, an AF (Auto Focus) zone switch $S_Z$ for changing-over the AF mode between spot AF mode and wide AF mode in which an AF zone (area) capable of detecting a focus condition is wider than that of the spot AF mode, a drive switch $S_D$ for setting the drive (film transport) mode in one-shot mode or continuous-shot mode, a mode swich $S_{MOD}$ for setting the exposure mode in program mode or manual mode, an up switch Sup, a down switch Sdn, a photometric switch $S_1$ for starting photometry, a release switch $S_2$, and an $A_V$ switch $S_{AV}$ for changing-over the diaphragm aperture.

FIG. 2 shows positions where the respective switches other than the CAS switch $S_{CAS}$ are installed on the camera body 10. Here, the AF zone switch $S_Z$, the drive switch $S_D$ and the exposure mode switch $S_{MOD}$ are normally-opened switches which are turned on by depressing an operating key corresponding the respective switches and are turned off by releasing the key. The photometric switch $S_1$ and the release switch $S_2$ are driven by depressing one shutter button 15, and the photometric switch $S_1$ is turned on by a half depression of this button, and the release switch $S_2$ is turned on by a full depression of this button. On the other hand, the main switch $S_M$ is a sliding type switch alternatively selecting the ON position and the OFF position, and the up switch Sup and the down switch Sdn are of a sliding type operated by an up-down key 16. The up-down key 16 turns the down switch Sdn to ON by sliding in the direction (a), and turns the up switch Sup to ON by sliding in the direction (b), and is energized by a spring so as to return to the neutral position by detaching the hand.

Figure 5:
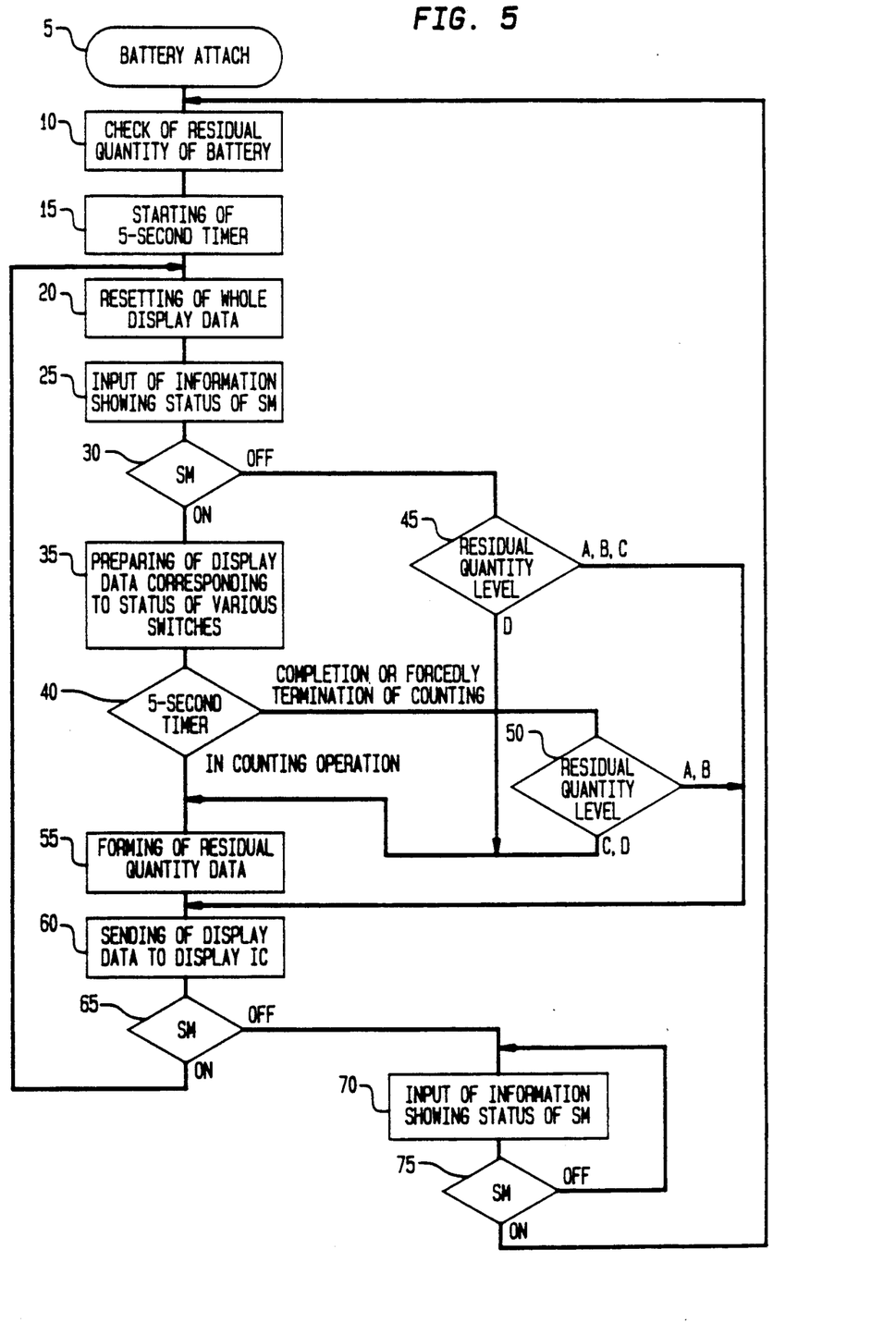
FIG. 5 and FIG. 6 are flowcharts showing operation display of a control part.

Next, description is made on a sequence of the CPU 1 for driving the display parts 8 and 9 of this embodiment in reference to each flowchart. First, FIG. 5 is a flowchart of operation of the CPU 1. When the battery 2 is attached to the camera body 10 (#5), the CPU 1 checks the residual quantity of capacity of the battery 2 by means of detecting a voltage of the battery 2 (#10), and starts a five-second timer to count five seconds (#15). This timer is built in a micro-computer configurating the CPU 1. Next, the whole display data for driving each display of the segments configuring the display parts 8 and 9 are reset (#20), and information showing the state of the main switch $S_M$ is inputted into the CPU 1 (#25). Thereafter, in step #30, it is judged whether or not the main switch $S_M$ is in the ON state. Here, where the main switch $S_M$ is in the ON state, display data corresponding to the states of various switches are prepared in step #35 according to a flowchart of FIG. 6 as described later, and in the next step #40, the state of the five-second timer is judged.

When the five-second timer is in a counting operation, display data for displaying and the battery residual quantity data is prepared (#55), and the display data are sent to the display IC 6 (#60). Thereby, display including the display of the residual quantity of battery capacity is performed on ther display parts 8 and 9.

In step #65, if the main switch $S_M$ is in the ON state, processing returns to step #20, repeating the execution of this step #20 and the subsequent steps.

When the main switch $S_M$ is in the OFF state in the judgement of the state of the main switch $S_M$ in the above-mentioned step #30, processing proceeds to step #45, and judges the residual quantity level of battery capacity. Here, where the level of residual quantity is very high (A), high (B) or low (C), the display data of the residual quantity of battery capacity is not prepared (that is, step #55 is skipped), and processing proceeds to step #60. As a result, the residual quantity of battery capacity is not displayed, and nothing is displayed on the display parts 8 and 9.

On the other hand, when the level of residual quantity of battery capacity is zero (D), processing proceeds from step #45 to step #55, and the display data of the residual quantity of battery capacity is formed, and therefore in the subsequent step #60, the residual quantity of battery capacity is displayed.

At this point, based on the information inputted in the above-mentioned step #25, the state of the main switch $S_M$ is checked again (#65), and if the main switch $S_M$ is in the OFF state, processing proceeds to steps #70 and #75, and waits until the main switch $S_M$ is turned to ON again. Then, when the main switch $S_M$ is put in the ON state from the OFF state, processing returns to step #10, and executes the flow of step #10 and the subsequent steps.

In the above-mentioned step #40, when the five-second timer has terminated counting, or when any of the switches $S_1$, $S_{MOD}$, $S_D$, $S_Z$, Sup and Sdn is operated (Sup and Sdn are limited to the case of the manual exposure mode), and counting is forcibly terminated, processing proceeds to step #50, and judges the level of residual quantity. The judgement is step #50 is to perform sorting into (A) (B) and (C) (D) as mentioned above. Then, in the case of (A) or (B), the CPU 1 does not prepare the display data on the residual quantity of battery capacity by skipping step #55 and processing proceeds to step #60, while in the case of (C) or (D), the CPU 1 prepares the display data of the residual quantity of battery capacity in step #55 and processing proceeds to step #60.

Thus, considering step #45 and associated steps, when the level of the residual quantity of battery capacity is zero, to the photographer is so informed even if the main switch $S_M$ is in the OFF state, while when the level of the residual quantity of battery capacity is low (C), very high (A) or high (B), this is not displayed if the main switch is in the OFF state.

Furthermore, according to steps #40 and #50 and associated steps, even if the main switch is in the ON state, when a certain time (five seconds) has elapsed, the residual quantity of battery capacity is displayed only in the case of (C) (low) or (D) (zero), and in the case of (A) (very high) or (B) (high), the residual quantity is not displayed. In addition, when any of the switches $S_1$, $S_{MOD}$, $S_D$, $S_Z$, Sup and Sdn is operated (Sup and Sdn is limited to the case of the manual exposure mode), likewise, the display is performed only in the case of (C) or (D), and no display is performed in the case of (A) or (B) concerning the residual quanity of battery capacity. That is why, considering a narrow display spaced in the display parts 8 and 9, a display showing that the residual quantity of battery capacity is high should not be preceded in relation with other displays when a new display by an operation of the switch is required. After the main switch $S_M$ changes over to the ON state from the OFF state, whatever the level of residual quantity of battery capacity is, it is displayed for a certain limited time.

Note that when any of the switches $S_1$, $S_{MOD}$, $S_D$, $S_Z$, Sup and Sdn is operated (Sup and Sdn is limited to the manual exposure mode), the level of residual quantity is not displayed in the case of the above-mentioned (A) or (B) even if within the certain time.

Figure 6:
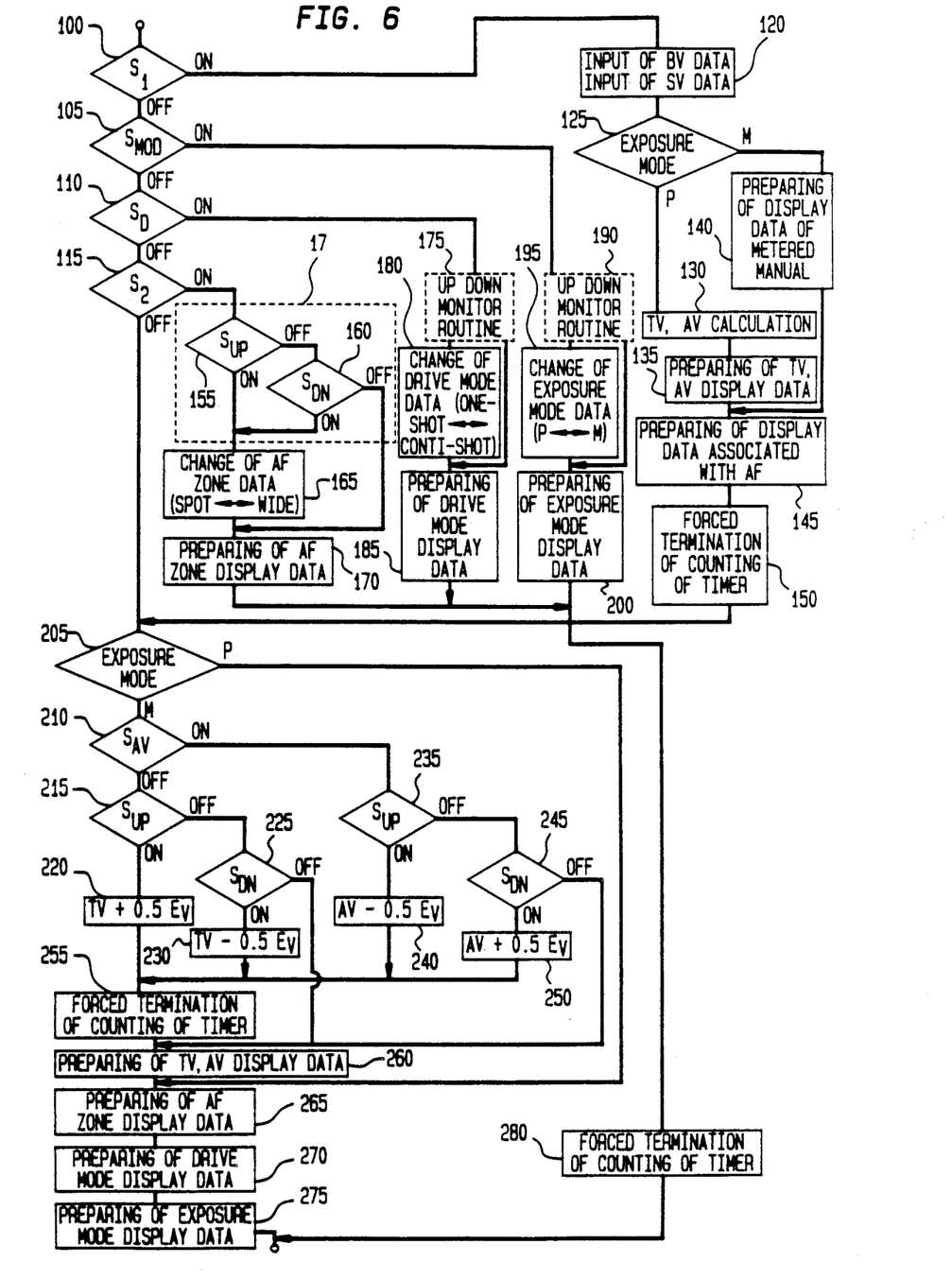

Next, details of preparation of display data in step #35 in FIG. 5, that is, display data a corresponding to the state of various switches is shown in FIG. 6 to be explaned. In FIG. 6, first, it is judged whether or not the photomertic switch $S_1$ is in the ON state. When this switch $S_1$ is in the ON state, processing proceeds to step #120. Here, the CPU 1 inputs luminance $B_V$ data from the photometric circuit 4, inputs film speed $S_V$ data, and subsequently judges the exposure mode in step #125. Here, in the case of the program mode (P mode), the shutter speed $T_V$ and the diaphragm aperture value $A_V$ are calculated (#130), and display data of $T_V$ and $A_V$ are prepared (#135), and processing proceeds to step #145. Where it is judged that the mode is the manual mode (M mode) in step #125, display data necessary for the metered manual operation in which the camera serves as a guide for setting $T_V$ or $A_V$ manually is prepared in step #140, and processing proceeds to step #145. In step #145, display data associated with AF is prepared.

Thereafter, in step #150, the above-mentioned five-seconds timer is forcibly terminated, and processing proceeds to step #205. In step #205, the exposure mode is judged, and when the result is the P mode, processing proceeds to step #265. When the result is the M mode, it is judged in step #210 whether the diaphragm aperture value $A_V$ or the shutter speed $T_V$ state is capable of alteration by the state of the $A_V$ change-over switch $S_{AV}$. This means that, here, if an $A_V$ change-over switch $S_{AV}$ is in the OFF state, the shutter speed $T_V$ is made variable, and if it is in the ON state, the diaphragm aperture value $A_V$ is made variable by means of the up-down key 16.

Then, the up switch Sup is in the ON state in step #215, processing proceeds to step #220, and the value of $T_V$ is incremented by $0.5E_V$, and if in the OFF state, ON or OFF of the down switch Sdn is judged in step #225. When the down switch Sdn is in the ON state, processing proceeds to step #230, and the value of $T_V$ is decremented by $0.5E_V$, and when in the OFF state, nothing is performed. After steps #220 and #230, processing proceeds to step #255, and in the case of OFF in step #225, processing proceeds to step #260. Steps #235 to #260 relating to the change of the $A_V$ value correspond to the above-mentioned steps #215 to #230 relating to the change of the $T_V$ value, and therefore description thereon is omitted.

In step #255, the five-second timer is forcibly terminated, and in the next step #260, display data of $T_V$ and $A_V$ are prepared, and processing proceeds to step #265. In step #265, display data of the AF zone is prepared, and in the subsequent step 190 270, display data of the drive mode is prepared, and in the step #275, display data of the exposure mode is prepared respectively, and processing returns.

When the switch $S_1$ is in the OFF state in the above-mentioned step #100, preocessing proceeds to step #105 and the subsequent steps, and when any of the mode switch $S_{MOD}$, the drive switch $S_D$ and the AF zone switch $S_Z$ has been turned to ON, processing proceeds to a routine of preparing display display data corresponding to that switch in the ON state. For example, when the AF zone switch $S_Z$ is in the ON state, first, judgements of the states of the up switch Sup and the down switch Sdn are made in steps #155 and #160 of an up-down monitor routine 17, and when the up switch Sup is in the ON state or the down switch Sdn is in the ON state, processing proceeds to step #165, and performs a change of the AF zone data. That is, the AF zone data is changed between two data corresponding to the spot AF mode and the wide AF mode. Then, after performing the change in this step #165, processing proceeds to step #170. When both of the up switch Sup and the down switch Sdn are in the OFF state, processing skips step #165 and proceeds to step #170. In step #170, display data of the AF zone is prepared.

Among the above-mentioned respective switches, when the drive switch $S_d$ is in the ON state, processing proceeds to step #175, and when the mode switch $S_{MOD}$ is in the ON state, processing proceeds to step #190 respectively, and these steps #175 and #190 are the same as the above-mentioned up-down monitor routine 17, and therefore only a block diagram thereof is shown, and an illustration of these steps is omitted.

When the up switch Sup or the down switch Sdn is in the ON state in the above-mentioned step #175, a change of drive mode data is performed between two data corresponding to the one-shot mode and the continuous shot mode in step #180, and thereafter or when both of the up switch Sup and the down switch Sdn are in the OFF state, processing proceeds to step #185, and prepares display data of the drive mode. Operations in steps #190, #195 and #200 are similar to the above-mentioned AF zone or drive mode except that they relate to the exposure mode, and therefore description thereon is omitted.

After the display data has been prepared in the above-mentioned steps #170, #185 or #200, the five-second timer is forcibly terminated in step #280, and processing returns. Here, the forced termination of the five-second timer means that, as explained on the flowchart in FIG. 5, if the residual quantity of battery capacity is (A) or (B), the residual quantity of battery capacity is not displayed, and this is because the display of the residual quantity of battery capacity disturbs display of the data prepared in the above-mentioned step #170, #185, or #200. Note that when the residual quantity of battery capacity is (C) or (D), as described before, the residual quantity of battery capacity is also displayed to call attention to the low state of battery.

Figure 7:
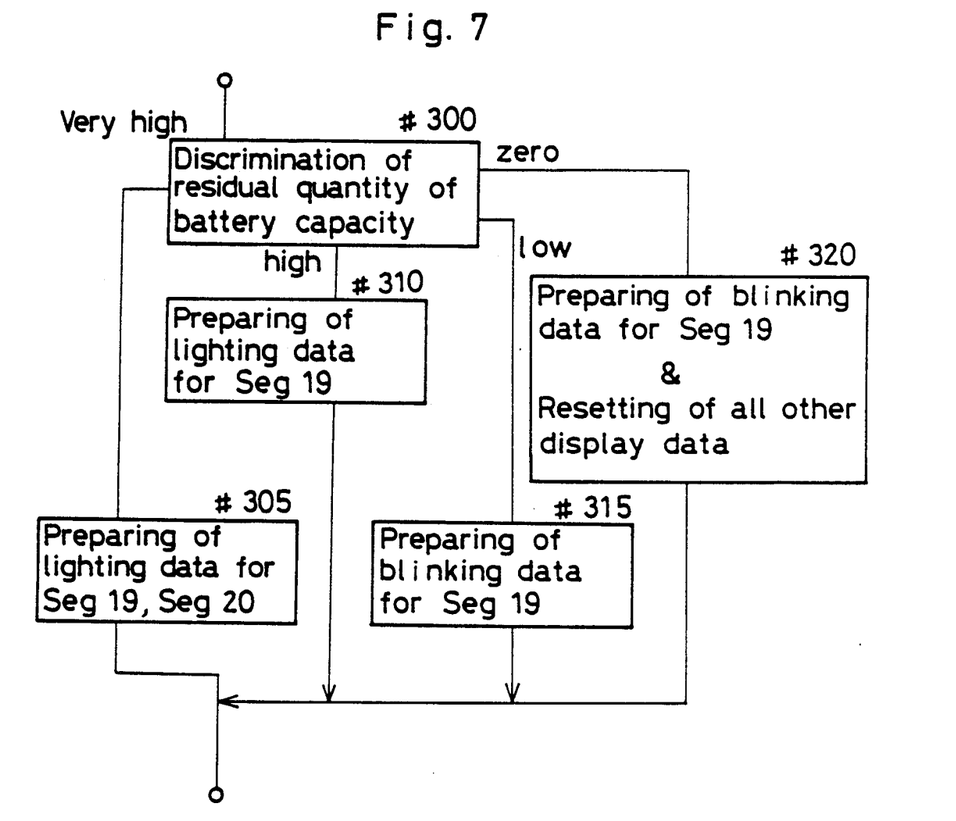
FIG. 7 is a flow chart showing a routine preparing data of residual quantity of battery capacity.
Figure 8:
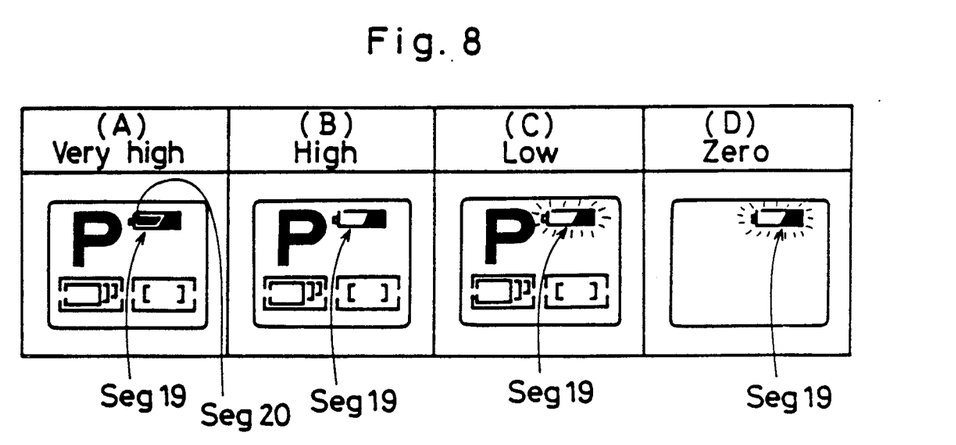
FIG. 8 is a view showing examples of display of the residual quantity of battery capacity.

Next, detailed description is made on preparation of display data of the residual quantity of battery capacity in step #55 in FIG. 5 in reference to FIG. 7 and FIG. 8. In FIG. 7, first, the CPU 1 performs discrimination of the residual quantity of battery capacity (#300) between the four levels, that is, very high (A), high (B), low (C) and zero (D), in the same manner described at step #45 or #50 in FIG. 5. Where the judgement results in very high (A), processing proceeds to step #305, and prepares data for lighting both of segments Seg 19 and Seg 20 of the display mark for the battery in the external display part 8 in FIG. 8. Here, the segment Seg 19 forms a general shape of the battery, and the segment Seg 20 forms a shape of tapezoid disposed therein.

Where the judgement results in high (B) in step #300, only data for lighting the segments Seg 19 is prepared in step #310. Accordingly, as shown in FIG. 8, at this time, the inner trapezoid (segment Seg 20) is not displayed. Where the judgement results in low (C) in step #300, data for blinking the segment Seg 19 is prepared in step #315. Accordingly, in this case, as shown in FIG. 8, display of the segment Seg 19 blinks. Where the judgement results in zero (D) in step #300, processing proceeds to step #320, and prepares data for blinking the segment Seg 19, and reset all of the other display data. According to this, the other displays are erased in the external display part 8, and only the segment Seg 19 is displayed in a blinking fashion. In addition, in FIG. 8, the frequency of blinking of the above-mentioned segment Seg 19 is selected, for example, to 2 Hz, and the frequency is not limited to this value, but may be selected to another proper frequency.

Figure 9:
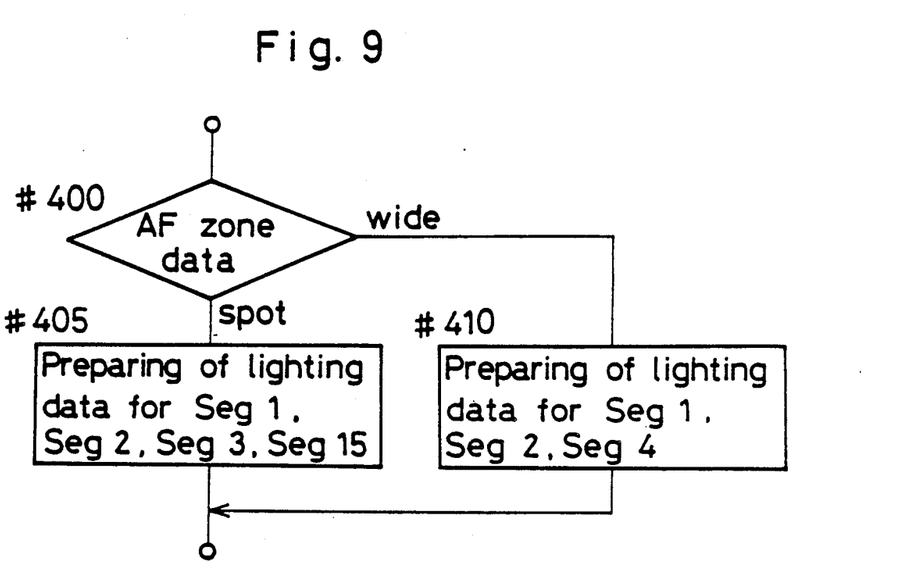
FIG. 9 is a flowchart showing a routine preparing display data of AF zone.
Figure 10:
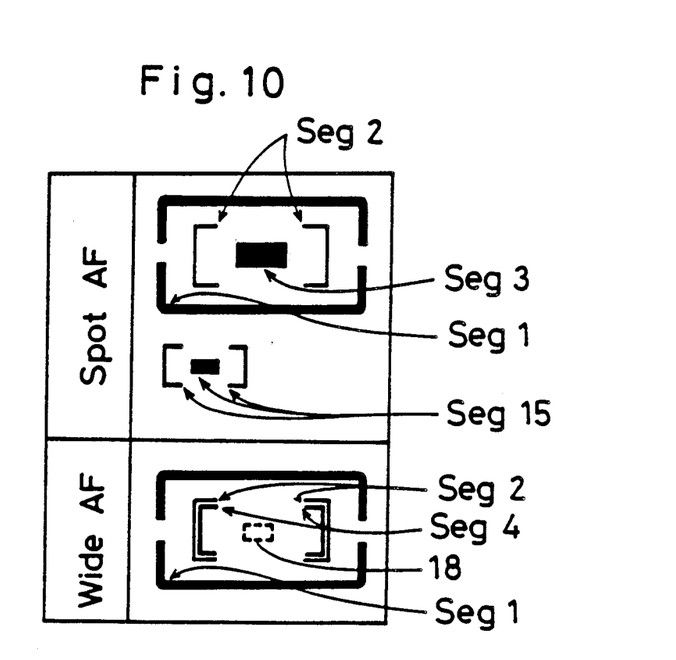
FIG. 10 is a view showing examples of display of the AF zone.

Next, description is made on preparation of the AF zone display data in step #170 or #265 in FIG. 6 in reference to FIG. 9 and FIG. 10. In FIG. 9, first in step #400, judgment of the AF mode is made based on the AF zone data prepared in step #165 in FIG. 6 or the AF zone data in the case where processing does not pass through step #165. And if the judgment results in the spot AF mode, processing proceeds to step #405, and if it results in the wide AF mode, processing proceeds to step #410. As shown in FIG. 10, the display for showing the AF zone (AF mode) is constituted with segments Seg 1 to Seg 4 for the external display part 8, and with a segment Seg 15 for the internal display part 9. In step #405, data for lighting Seg 1, Seg 2, Seg 3 and Seg 15 out of the above-mentioned segments are prepared, and in step #410, data for lighting the segments Seg 1, Seg 2 and Seg 4 are prepared.

In addition, the reason why display of the internal display part 9 installed in the finder is not performed at the wide AF mode is that the wide AF mode is a normal mode and no warning is required. On the other hand, the spot AF mode is a special mode, and lighting display is performed also on the internal display part 9 in the finder as a warning to inform of it.

For the external display part 8, the segment Seg 1 as an image area frame and the segment Seg 2 showing the wide AF zone are lit in the both cases of spot AF mode and wide Af mode, and the segment Seg 3 is lit in the case of spot AF mode, while the segment Seg 4 is lit in the case of wide AF mode. As a result, a thin display mark corresponding to wide AF zone (Seg 2) is lit in the case of spot AF mode and a thick display mark corresponding to wide AF zone (Seg 2+Seg 4) is lit in the case of wide AF mode. In addition, the display for wide AF zone in the case of the wide AF mode may be constituted by one thick segment (not illustrated) in a form of uniting the segments Seg 2 and Seg 4 in place of the two segments Seg 2 and Seg 4. In either case, the display for the wide AF zone (Seg 2) is performed in the spot AF mode, and therefore the spot AF zone (Seg 3) is emphasized and the spot AF mode is easy to recognize. It is also possible that the spot AF zone is indicated by displaying an equivalent 18 to the contour of the segment 3 in the wide AF mode.

Figure 11:
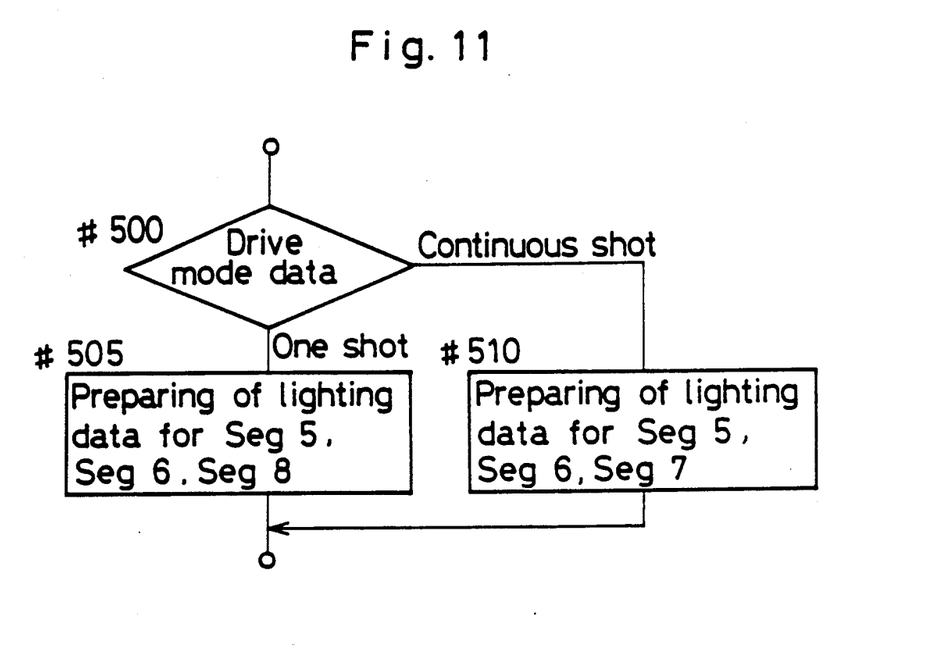
FIG. 11 is a flowchart showing a routine preparing drive mode display data.
Figure 12:
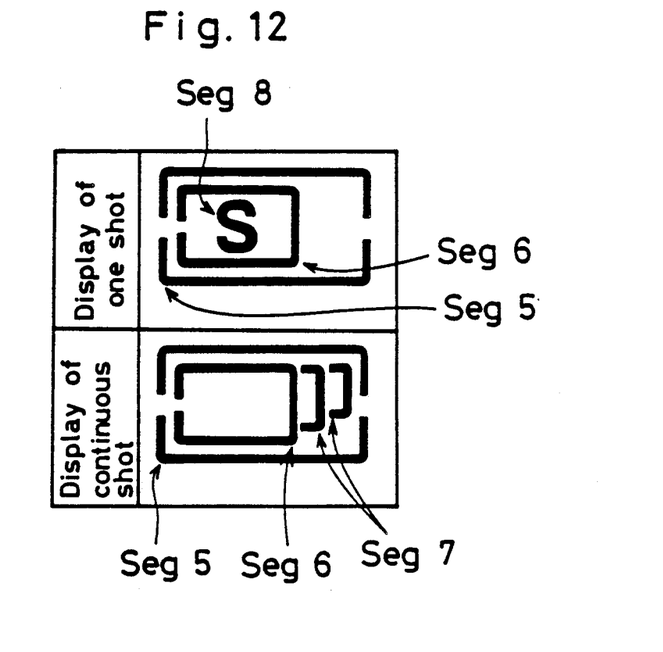
FIG. 12 is a view showing examples of display of the drive mode.

Next, description is made on preparation of display data for the drive mode in step #185 or #270 of FIG. 6 based on specific example thereof as shown in FIG. 11 and FIG. 12. First, in step #500, whether the present drive mode is continuous-shot mode or one-shot mode is judged based on the drive mode data, and processing proceeds to step #505 in the case of one-shot mode and to step #510 in the case of continuous-shot mode to prepare the display data for lighting the segments constituting the display mark for showing the drive mode. This means that, in step #505, data for lighting segments Seg 5, Seg 6, and Seg 8 as shown in FIG. 12 is prepared relating to the display of the external display part 8, and in step #510, data for lighting the segments Seg 5, Seg 6 and Seg 7 are prepared. Here, a character S by the segment Seg 8 represents "Single" relating to the one-shot mode.

In accordance with the displays for one-shot mode and continuous-shot mode in FIG. 12, both displays are performed in the same space with the display marks used partly in common, and therefore an advantage is obtainable that narrow space can be effectively utilized in a narrow display part of the camera.

Figure 13:
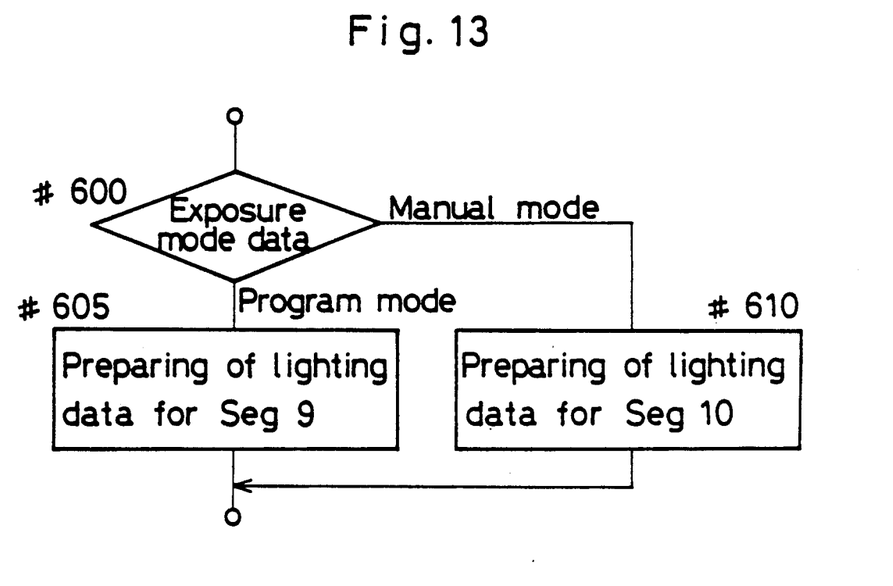
FIG. 13 is a flowchart showing a routine preparing exposure mode display data.
Figure 14:
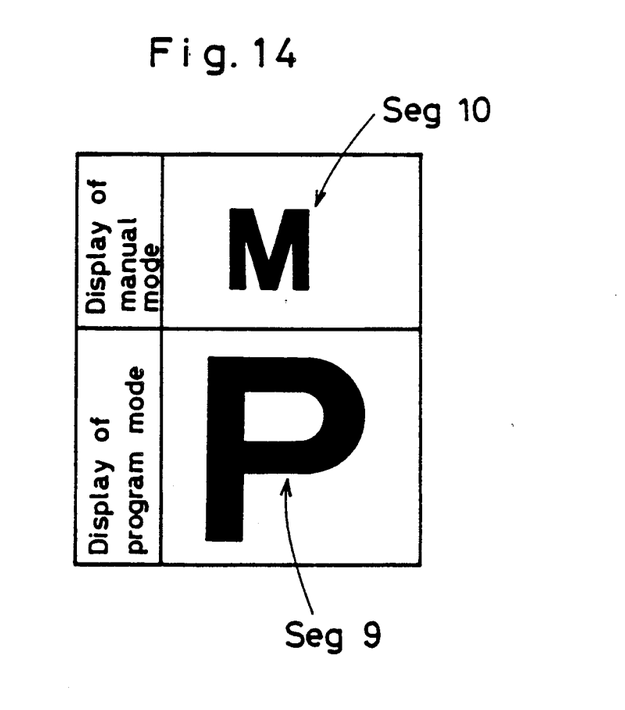
FIG. 14 is a view showing examples of the exposure mode.

Next, description is made on exposure mode display data in step #200 or #275 in FIG. 6 based on specific examples thereof as shown in FIG. 13 and FIG. 14. First, in step #600, it is judged whether the present exposure mode is of the P mode or the M mode based on the exposure mode data, and processing proceeds to step #605 in the case of the P mode and to step #610 in the case of the M mode to prepare data for lighting the segments constituting the display marks for showing the exposure mode. This means that, in step #605, data for lighting a segment Seg 9 constituting a character P signifying the P mode as shown in FIG. 14 is prepared, and in step #610, data for lighting a segment Seg 10 constituting a character M signifying M mode is prepared.

Figure 15:
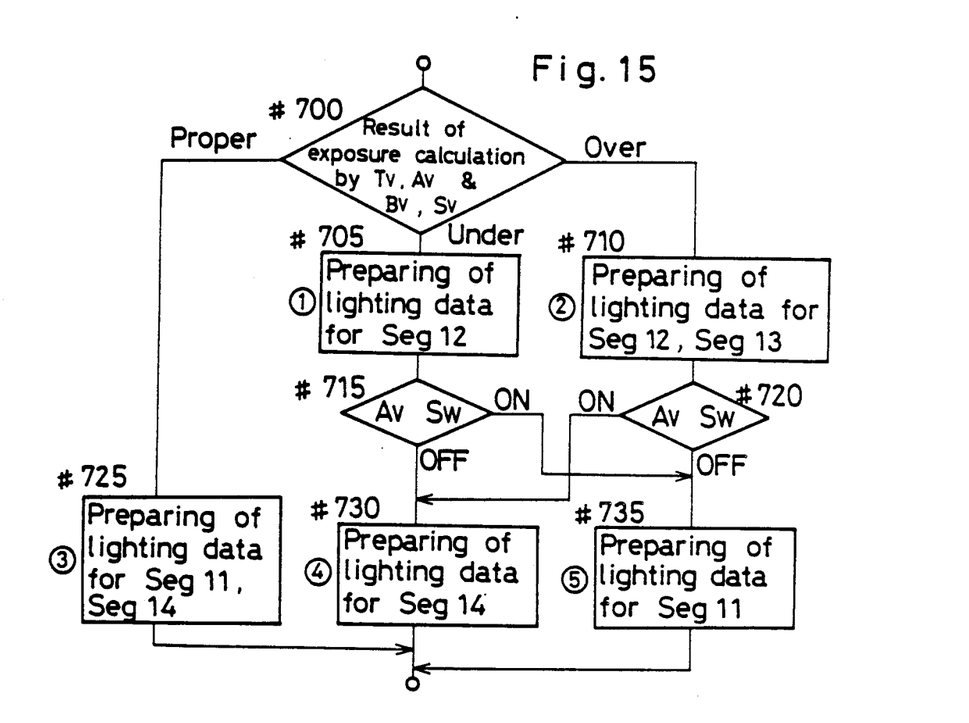
FIG. 15 is a flowchart showing a routine preparing metered manual display data.
Figure 16:
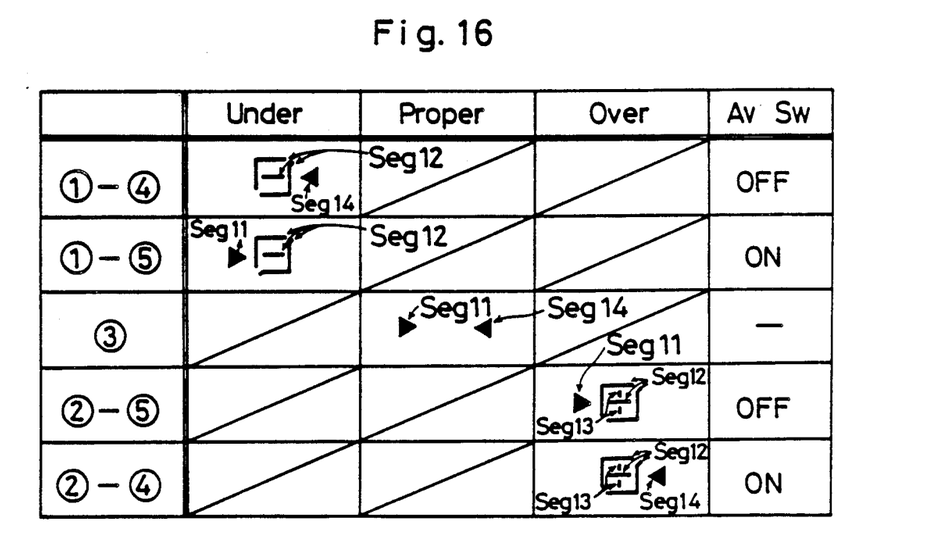
FIG. 16 is a view showing examples of display for the metered manual.

Next, description is made on display data used in the metered manual operation as shown in step #140 in FIG. 6 based on specific examples thereof as shown in FIG. 15 and FIG. 16. In addition, in this embodiment, consideration is given so that, as is understood from the following description, the direction of correction to set the correct exposure condition by the up-down key 16 can be found by looking at a display in the finder, that is, a display on the internal display part 9 irrespective of operation of the $A_V$ switch $S_{AV}$. Note that the quantity of correction cannot be found. First, as shown in FIG. 16, an under display mark for showing underexposure condition is constituted by a segment Seg 12 comprising a frame portion and a minus portion (−), and an over display mark for showing overexposure condition is constituted in a form that only a segment Seg 13 is added to the under display mark, so that shape of a plus sign is displayed in the frame portion in the overexposure condition. Besides, a mark showing that the up switch Sup should be operated to get the correct exposure condition is constituted by a segment Seg 11, and a mark showing that the down switch should be operated is constituted by a segment Seg 14.

In this embodiment, a method is adopted such that when the shutter speed $T_V$ value is changed, that is, in the OFF state of the $A_V$ switch $S_{AV}$, if the up switch Sup is turned on, the $T_V$ in APEX system increases, and if the down switch Sdn is turned on, the $T_V$ in APEX system decreases, and when the diaphragm aperture $A_V$ is changed, that is, in the ON state of the $A_V$ switch $S_{AV}$, if the up switch Sup is turned on, the $A_V$ in APEX system decreases, and if the down switch Sdn is turned on, the $A_V$ in APEX system increases.

Then, in FIG. 15, first in step #700, the CPU 1 judges whether or not the exposure value corresponding to the set shutter speed $T_V$ and set diaphragm aperture $A_V$ is proper underexposure or overexposure in comparison with the result of the exposure calculation by the inputted luminance $B_V$ and the inputted film speed $S_V$, and thereafter processing proceeds to steps #725, #705 and #710 in the respective cases. Where the exposure value is proper, in step #725, data for lighting the segments Seg 11 and Seg 14 are prepared. Consequently, two correcting direction marks are displayed in the internal display part 9 as shown in FIG. 16. On the other hand, data for lighting the segment Seg 12 is prepared in step #705, and data for lighting the segments Seg 12 and Seg 13 are prepared in step #710. After steps #705 and #710, processing proceeds to steps #715 and #720 respectively, and judges whether the $A_V$ switch $S_{AV}$ is in the ON or OFF state, and if ON in step #705, proceeds to step #735, and if OFF, proceeds to step #730, while if ON in step #720, proceeds to step #730, and if OFF, proceeds to step #735.

As a result, when processing in a sequence of steps #705→#715→#730, display is performed as shown on line ①-④ in FIG. 16, and when processing proceeds in a sequence of steps #705→#715→#735, display is performed as shown on line ①-⑤. On the other hand, when processing proceeds in a sequence of steps #170→#720→#735, display is performed as shown on line ②-⑤, and when processing proceeds in a sequence of steps #710→#720→#730, display is performed as shown on line ②-④. Thus, in accordance with this embodiment, the mark showing which switches Sup or Sdn should be opeated to get the correct exposure condition is displayed in the finder. Namely, if the segment Seg 11 is displayed, the down switch Sdn may be operated and if the segment Seg 14 is displayed, the up switch Sup may be operated to get the correct exposure condition regardless of the state of the $A_V$ switch $S_{AV}$, so that it is convenient to the photographer.

Figure 17:
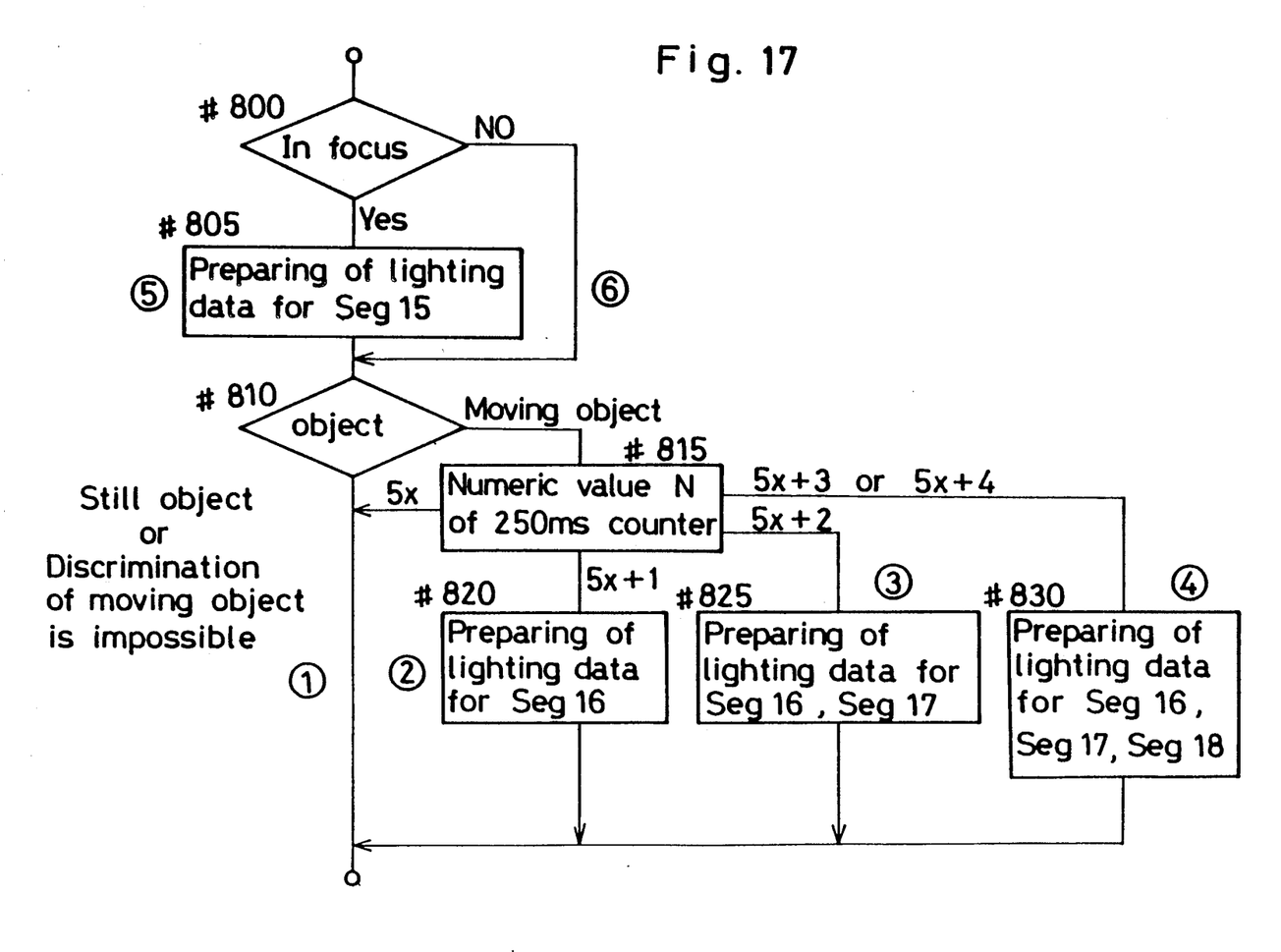
FIG. 17 is a flowchart showing a routine preparing display data relating to AF.
Figure 18:
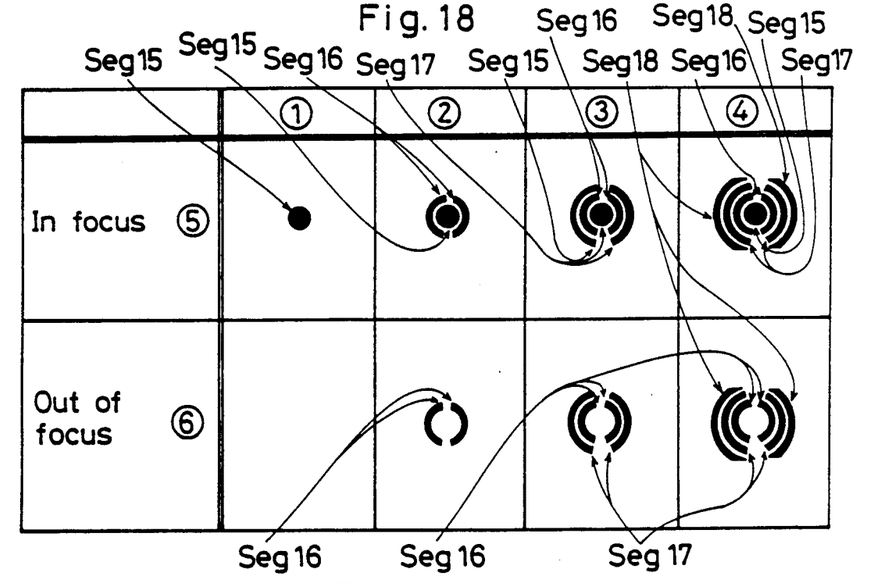
FIG. 18 is a view showing examples of display showing that an object is moving.

Finally, description is made on preparation of display data associated with AF in step #145 in FIG. 6 in reference to FIG. 17 and FIG. 18. In addition, display for this data is performed on the internal display part 9. First, in step #800, it is judged whether or not the lens is an in-focus condition relating to an object to be photographed based on the focus detection data inputted from the focus detection circuit 5, and in the case of an in-focus condition, data for lighting the segment Seg 15 to show an in-focus condition is produced in step #805. This segment Seg 15 is a dot of a predetermined size as shown in FIG. 18. Subsequently processing proceeds to step #810, and judges whether or not the object is moving based on the focus detection data. As a result of the judgment, if the object is not moving, that is, the object is still in a position or the judgment is impossible, processing returns, and if the object is moving, processing proceeds to step #815. In step #815, a counting number N of a 250 ms counter for counting 250 milliseconds is read out, and when the counting number N is 5x (x is an integer of 0 or more), processing returns, and when it is 5x+1, proceeds to step #820 to produce display data for lighting segments Seg 16. These segments and segments Seg 17 and Seg 18 as described later are patterned in a form of spreading sequentially around the segment Seg 15 forming the in-focus mark as shown in FIG. 18.

In step #815, when the counting number N is 5x+2, the segments Seg 16 and Seg 17 are prepared in step #825, and when it is 5x+3 or 5x+4, display data for lighting the segments Seg 16, Seg 17 and Seg 18 are prepared in step #830. As a result, if the object is moving, the display changes in a sequence of ①→②→③→④→④ every 250 milliseconds and returns to ① step after ④ step. The display in the ④ step is displayed longer than that in the other steps, but it is not necessarily limited to this manner. Thus, in this embodiment, the display looks like flowing when the object is moving. In addition, the display showing that the object is moving is performed by the segments spreading sequentially around the position where the segment Seg 15 to show the in-focus condition is located, but the display is not limited to this. For example, a plurality of segments for showing a display looking like rotating clockwise or counter clockwise around the segment Seg 15 may be installed.

Figure 19:
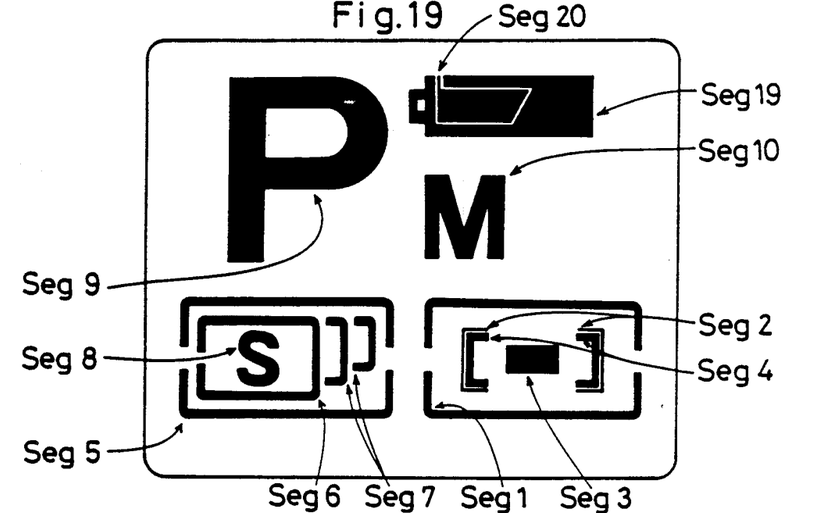
FIG. 19 is a view showing an example of display of a display part installed on the top surface of the camera.
Figure 20:
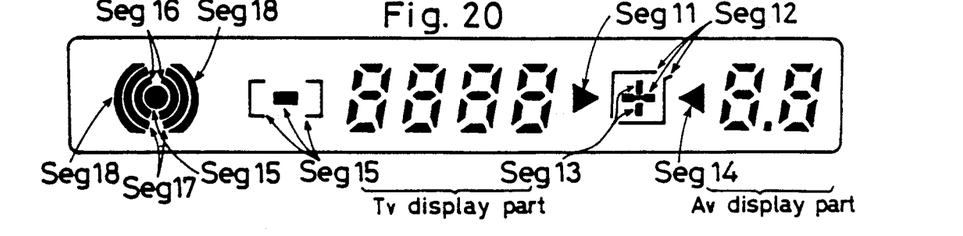
FIG. 20 is a view showing an example of the display part installed in the finder.

FIG. 19 and FIG. 20 show various displays as described above in a lump. Here, FIG. 19 shows the external display part 8, and FIG. 20 shows the internal display part 9 installed in the finder 20.

What is claimed is:

1. A camera with a display device, comprising:
   manually operable means having a first state in which the camera cannot be operative and a second state in which the camera can be operative for changing over from one state to the other state;
   timer means for counting a predetermined period of time in response to a change of said manually operable means from the first state into the second state;
   a battery for supplying electrical power to circuits in the camera;
   battery checking means for checking a state of said battery;
   display means for displaying the state of said battery based on a result of said battery checking means during at least the predetermined period of time, said display means having a first mode indicating that the state of said battery is better for the camera than a predetermined state and a second mode indicating that the state of said battery is not better for the camera than the predetermined state; and
   means for turning off said display menas, after lapse of the predetermined period of time, when said display means is in the first mode and for causing said display means to remain on irrespective of the lapse predetermined period of time when said display means is in the second mode.

2. A camera as claimed in claim 1, wherein said battery checking means comprises means for detecting a voltage of said battery for checking the state of said battery.

3. A camera as claimed in claim 2, wherein said manually operable means is a main switch of the camera.

4. A camera with a display device, comprising:
   first manually operable means having a first state in which the camera cannot be operative and a second state in which the camera can be operative for changing over from one state to the other state;
   a battery for supplying electrical power to circuits in the camera;
   battery checking means for checking a state of said battery;
   display means for displaying the state of said battery based on a result of said battery checking means responsive to a change of state of said first manually operable means from the first state into the second state, said display means having a first mode indicating that the state of said battery is better for the camera than a predetermined state and a second mode indicating that the state of said battery is not better for the camera than the predetermined state;
   second manually operable means;
   light measuring means for measuring brightness of an object in response to an operation of said second manually operable means when said first manually operable means is in the second state; and
   means for turning off said display means, at the time of operation of said second manually operable means, when said display means in the first mode and for causing said display means to remain on irrespective of the operation of said manually operable means when said display means is in the second mode.

5. A camera as claimed in claim 4, wherein said battery checking means comprises means for detecting a voltage of said battery for checking the state of said battery.

6. A camera as claimed in claim 5, wherein said first manually operable means is a main switch of the camera.

7. A camera with a display device, comprising:
   manually operable means having a first state in which the camera cannot be operative and a second state in which the camera can be operative for changing over from one state to the other state;
   a battery for supplying electrical power to circuits in the camera;
   battery checking means for checking a state of said battery;
   display means for displaying the state of said battery, said display means having a first mode indicating that the state of said battery is better for the camera than a predetermined state and a second mode indicating that the state of said battery is not better for the camera than the predetermined state; and
   means for turning off the display of said display means, in response to a change of state of said manually operable means from the second state into the first state, when said display means is in the first mode and for causing said display means to remain on when said display means is in the second mode.

8. A camera as claimed in claim 7, wherein said battery checking means comprises means for detecting a voltage of said battery for checking the state of said battery.

9. A camera as claimed in claim 8, wherein said manually operable means is a main switch of the camera.

10. A camera with a display device, comprising:
    a battery for supplying electrical power to circuits in the camera;
    battery checking means for checking a state of said battery;
    display means for displaying the state of said battery based on a result of said battery checking means, said display means having a first mode indicating that the state of said battery is better for the camera than a predetermined state and a second mode indicating that the state of said battery is not better for the camera than the predetermined state;
    manually operable means; and
    means for turning off the display means, at the time of operation of said manually operable means, when said display means is in the first mode and for causing said display means to remain on irrespective of the operation of said manually operable means when said display means is in the second mode.

11. A camera as claimed in claim 10, wherein said battery checking means comprises means for detecting a voltage of said batery for checking the state of said battery.

12. A camera as claimed in claim 11, wherein said manually operable means is a main switch of the camera.

13. A camera as claimed in claim 11, wherein said manually operable means is a mode switch for setting an exposure mode.

14. A camera as claimed in claim 11, wherein said manually operable means is a switch for changing an exposure value.

15. A camera as claimed in claim 10, wherein said manually operable means is a light measuring switch for measuring brightness of an object.

16. A camera with a display device, comprising:
   manually operable means having a first state and a second state;
   light measuring means for measuring brightness of an object in response to a change of state of said manually operable means from the second state into first state;
   a battery for supplying electrical power to circuits in the camera;
   battery checking means for checking a state of said battery;
   display means, responsive to a change of state of said manually operable means from the second state into the first state, for displaying the state of said battery based on a result of said batter checking means and displaying a shutter speed and an aperture size based on a result of said light measuring means; and
   control means, after said manually operable means changes into the second state from the first state on condition that the state of said battery is not better for the camera than a predetermined state, for causing said display means to continue to display the state of said battery and turn off the display of the shutter speed and the aperture size.

* * * * *